United States Patent [19]

Pullukat et al.

[11] Patent Number: 4,499,198

[45] Date of Patent: Feb. 12, 1985

[54] POLYMERIZATION CATALYSTS AND METHODS

[75] Inventors: Thomas J. Pullukat, Hoffman Estates; Raymond E. Hoff, Palatine; Michael W. Lynch, Schaumburg, all of Ill.

[73] Assignee: Chemplex Company, Rolling Meadows, Ill.

[21] Appl. No.: 433,369

[22] Filed: Oct. 7, 1982

[51] Int. Cl.$^3$ .................................................. C08F 4/64
[52] U.S. Cl. ................................. 502/104; 502/103; 502/113; 502/116; 502/119; 502/127; 526/127
[58] Field of Search ........... 252/429 B, 429 C, 431 N; 502/104, 113, 116, 119

[56] References Cited

U.S. PATENT DOCUMENTS

| | | | |
|---|---|---|---|
| 3,135,809 | 6/1964 | Bosmajian | 252/429 A X |
| 4,173,547 | 11/1979 | Graff | 252/429 B |
| 4,263,171 | 4/1981 | Shida et al. | 252/429 C |
| 4,324,691 | 4/1982 | Hartshorn et al. | 252/429 B |
| 4,383,119 | 5/1983 | Pullukat et al. | 252/431 N X |

FOREIGN PATENT DOCUMENTS 84948  4/1957  Holland.

OTHER PUBLICATIONS

Chemical Abstracts 43543y (2/18/74).
Wannagot et al., "Tetrakis (trimethylsilyl)-magnesiumdiamid", in Zeitschrift für Anorganische und Allgemeine Chemie, pp. 254-262 (1972).

*Primary Examiner*—Patrick Garvin
*Attorney, Agent, or Firm*—Wood, Dalton, Phillips, Mason & Rowe

[57] ABSTRACT

An olefin polymerization and interpolymerization catalyst composition prepared by reacting novel magnesium silylamide compounds with at least one compound of a transition metal selected from Groups IIIB, IVB, VB and VIB of the fourth and fifth periods of the periodic table, and Groups VIIB and VIIIB of the fourth period.

24 Claims, No Drawings

POLYMERIZATION CATALYSTS AND METHODS

SUMMARY OF THE INVENTION

This invention relates to a new class of polymerization catalysts, methods of making the catalysts and methods of polymerizing and interpolymerizing 1-olefins with the new catalysts. The catalysts are prepared by reacting novel magnesium silylamide compounds which have magnesium-nitrogen-silicon bonds as disclosed in Pullukat and Hoff patent application Ser. No. 384,885 filed June 4, 1982 and now U.S. Pat. No. 4,383,119, and transition metal compounds.

Catalysts of this invention are highly active and are suitable for polymerization of ethylene and other 1-olefins, particularly of 2-8 carbon atoms, and interpolymerization of these with 1-olefins of 3-20 carbon atoms, such as propylene, butene and hexane, for example, to form polymers of low and medium densities. These catalysts are suitable for particle form, solution form, and gas phase olefin polymerization since they can be added to the reactor as solids, slurries, dispersions in hydrocarbon liquids and as colloidal suspensions. These catalysts are also suitable for use in retrofitted high pressure, high temperature low density reactors.

The silylamide catalysts of this invention have an enhanced relative reactivity towards 1-alkenes in interpolymer synthesis with ethylene. Such catalysts can provide many advantages in the manufacture of ethylene interpolymers. These advantages are easily recognized by research workers in the industry. However, since only speculative guidelines can be derived from chemical theories, the discovery of such improved catalysts has been sought for a long time by empirical methods.

This will allow manufacture of low density polyethylene in low pressure units in place of conventional energy intensive high pressure units. Recently, manufacture of low density polyethylene commonly called linear low density polyethylene (LLDPE) has been accomplished. The catalyst systems that are currently being used require high comonomer ratios and thus lead to process related problems.

LLDPE products are actually interpolymers of ethylene and 1-alkenes with densities from about 0.915 to about 0.925 g/cm$^3$. Their manufacture requires bringing together under suitable conditions ethylene, at least one 1-alkene and a catalyst. With any catalyst the amount of 1-alkene incorporated into the copolymer depends upon the molar ratio of 1-alkene to ethylene, and the particular 1-alkene involved; that is, whether it is 1-butene, or 1-hexene, etc. It is also a fact that with any known catalyst the molar ratio of 1-alkene to ethylene in the polymerization reaction greatly exceeds the molar ratio contained in the interpolymer. As a consequence it is necessary to separate the excess 1-alkene and recycle it for economical operation. Since the silylamide catalysts of this invention have higher relative reactivity towards 1-alkenes, LLDPE products can be made with a lower molar ratio of alkene to ethylene. Smaller equipment and less energy expense in recycling are required in any LLDPE process as a result.

Also in any process there is a stage in which the copolymer product is separated from the polymerization zone. At this stage, the product will contain some of the unpolymerized 1-alkene dissolved in the polymer. This unpolymerized 1-alkene must be removed. It can cause bubbling in extruders, odor problems and a fire hazard in storage. The amount of 1-alkene retained by the product is less when the concentration of 1-alkene is lower in the polymerization zone. Since the silylamide catalysts of this invention allow the desired LLDPE to be produced at lower 1-alkene concentrations, they have an advantage in this respect also.

In a slurry or particle form process, there is a practical limit to the concentration of 1-alkene in the polymerization zone. This limit is the point at which so much 1-alkene has been added that the particles of copolymer being to dissolve resulting in reactor fouling and process failure. Since 1-hexene is a better solvent than 1-butene, the allowable concentration for 1-hexene is lower than for 1-butene. This is also the case for 1-octene. In theory, the ethylene concentration could be decreased so that the molar ratio required for any copolymer product could be reached. This approach has a limit to its usefulness since overall production rates are decreased. The silylamide catalysts of this invention allow the manufacture of 1-hexene-ethylene copolymers in the particle form process at high production rates. There is added significance to this feature in that the 1-hexene interpolymer is superior to the butene copolymer as an LLDPE film resin because the film can be made stronger.

By proper selection of the novel magnesium compounds of this invention, the electronic and steric nature of the catalyst active site can be modified. As a result, the catalyst's polymerization activity and the properties of the polymers produced can be controlled.

DESCRIPTION OF THE PREFERRED EMBODIMENTS

The alkyl magnesium silylamide compounds used in this invention are new compounds represented by the formulas:

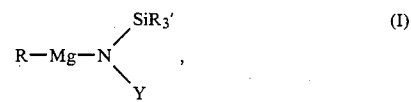

and

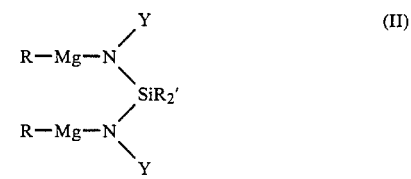

in which R is a straight or branched chain alkyl group including alkyl groups of about 1–18 carbon atoms, aryl groups of about 6 to 14 carbon atoms, and the R groups are the same or different. The alkyl or aryl R groups are preferably unsubstituted but may have inert substituents that are nonreactive to the highly reactive R—Mg, or Mg—N bonds, these substituents if used may be ether groups, tertiary amine groups, chloride and fluoride groups and combinations of these; R' is r or hydrogen; Y is R or —SiR'$_3$, all R' are the same or different and all Y are the same or different. The preferred compounds are readily soluble in liquid alkanes such as butane, hexane and other simple liquid hydrocarbons.

The magnesium silylamide compounds I and II of this invention may be made by the methods described in the above copending Pullukat and Hoff application as follows: One very convenient method of synthesis is to combine a silylamine which has an acidic N—H group with a mixed dialkyl magnesium compound solution, such as a solution of butyl ethyl magnesium. The silylamine N—H will displace the most reactive alkyl groups as in:

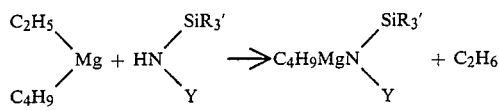

The following synthesis methods may also be used:
(1) A trialkylsilyl chloride is combined with a primary amine in the presence of a tertiary amine to trap HCl. To the reaction mixture a solution of dialkylmagnesium is added. Precipitated tertiary amine hydrochloride is filtered out to give a chloride and ether-free solution of alkyl magnesium silylamide. This method synthesizes a silylamine by known methods without requiring that the silylamine be separated from the reaction mixture.
(2) The following procedure using the reaction of a Grignard reagent with a lithium silylamide may also be used:

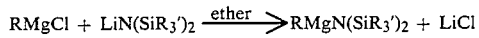

After the addition of the lithium silylamide to the Grignard reagent in ether, a hydrocarbon solvent with a higher boiling point than the ether is added. The ether is then removed as by distillation. The lithium chloride is then removed as by filtration.
(3) When the ether is removed from a Grignard reagent, a solid residue remains. Extraction of this residue with a solution of silylamine provides an ether and halide free solution of alkyl magnesium silylamide.
(4) Magnesium metal, an alkyl halide, and a silylamine can be coreacted in an aromatic or aliphatic hydrocarbon to yield an alkyl silylamide.

The transition metal compound is preferably a halide, oxyhalide, alkoxyhalide, or an alkoxide from Groups IIIB, IVB, VI and VIB of the fourth and fifth periods of the periodic table and Groups VIIB and VIIIB of the fourth period. Suitable transition metal compounds include $TiCl_4$, $Ti(OR^2)Cl_{4-x}$, $VOCl_3$, $VCl_4$, $Zr(OR^2)_xCl_{4-x}$ or mixtures of these and others where $R^2$ are alkyl groups containing 1-10 carbon atoms or aryl groups of 6-14 carbon atoms. The $R^2$ groups may be the same or different and x may be 0 to 4 inclusive.

The catalyst compositions may include third components such as Lewis acids or Lewis bases. Examples of Lewis acids are $R_n^3AlX_{3-n}$, $R_n^3BX_{3-n}$ where $R^3$ can be alkyl, aryl or trialkylsilyl, X=hydrogen or halogen; and n=0 to 3 inclusive. An example of a Lewis base is ethyl benzoate. The third component could also be a hydrogen halide.

The reaction between the alkyl magnesium silylamide and the transition metal is usually rapid and it is generally sufficient only to mix the components at room temperature in a hydrocarbon liquid as defined above.

A convenient way to conduct the reaction between the silylamide and the transition metal compound is in the presence of a liquid hydrocarbon solvent or diluent. After the reaction the hydrocarbon solvent can be removed to provide a catalyst in the form of a dry, free-flowing powder. However, it is not necessary to remove the solvent, and, in fact, for some processes it is desirable to suspend the catalyst in a moderately viscous oil. To promote the stability of the suspension, the catalyst may be pulverized, and agents which increase colloid stability may be added. The reaction can also be conducted in the absence of solvents in the ball mill or a ribbon blender or other suitable vessels.

Either the transition metal compound or the silylamide can be deposited on or reacted with a finely divided carrier material prior to the reaction. Suitable carriers are silica, alumina, zirconium phosphate and polyolefin powders.

Alternatively, the reaction between the silylamide and the transition metal compound can take place in the presence of such carrier and a hydrocarbon solvent. Another convenient procedure is to blend the carrier with the reaction product after the completion of the reaction.

The supported catalysts formed by these procedures may also be used as dry solids or as suspension. If desired, the particle sizes may be reduced by grinding or ball-milling.

The reaction between silylamide and the transition metal compound may be with a Mg/transition metal atom ratio of 1.0, but the ratio may be in a range of about 0.2–100 to 1, preferably between about 0.4–30 to 1.

In some cases the activity of the reaction product is increased by the addition of an organometallic cocatalyst either prior to polymerization or simultaneously with the introduction of the catalyst to the polymerization vessel. However, some catalysts do not require cocatalysts to exhibit polymerization activity. It is preferred to use an alkylaluminum compound as a cocatalyst. The ratio of aluminum to transition metal may range from about 0–500 to 1, preferably about 1–50 to 1. Various alkylaluminum compounds can function as cocatalysts, the preferred compounds depending upon the monomers and the polymerization conditions. Typically, suitable compounds are triethyl aluminum, triisobutylaluminum, diisobutylaluminum hydride, diethylaluminum chloride, ethyl aluminum dichloride, dialkylaluminum alkoxides, trioctyl aluminum, diethyl aluminum trimethylsiloxide, such as of the formula $$Et_2Al—O—Si(CH_3)_3,$$

their reaction products with small amounts of water, and complexes formed with Lewis basis like tertiary amines, ethers, and esters.

These catalysts are very effective in the polymerization of ethylene using any of the common commercial processes including solution form, particle form, and gas phase processes as well as in retrofit high pressure high temperature reactors. These processes may operate at pressure in the range of 15 psi to 40,000 psi.

Some polyethylene processes operate at about 80° C. or lower while others run at temperatures of about 300° C. The catalysts of this invention are intended, by appropriate changes within the scope of the disclosure, to be suitable for the entire temperature range of commercial processes, i.e. from about 25° C.–300° C.

These catalysts are suitable for interpolymerization, in any of the above mentioned processes by conducting the polymerization with other 1-olefins, for example, propylene, 1-butene, 1-hexene, 1-octene, etc., to produce polymers of low densities. The catalysts of this invention exhibit enhanced reactivity towards monomers like 1-butene and 1-hexene so that interpolymerizations of these monomers with ethylene are more efficient.

Polymerization by the catalysts is influenced by the —SiR′$_3$ and —Y groups and their steric requirements. As a result, varying the nature of the —SiR′$_3$ and —Y groups alters the properties of polymers and copolymers produced with the catalysts of the invention. In specific instances, proper selection of the —SiR′$_3$ or —Y groups or both results in enhanced relative reactivity of for example 1-butene or 1-hexene monomers so that copolymerization or terpolymerization of ethylene and these monomers can be conducted more efficiently.

The structure of polymers and copolymers can be controlled by proper selection of the magnesium silylamide and transition metal compounds to form the catalyst. In this way, the average molecular weight under any given conditions of polymerization and copolymerization can be regulated. As a result of such control, thermoplastic resins with better strength or processing characteristics can be produced.

The alkyl magnesium silylamides used in this invention are in many cases soluble in hydrocarbons and can be obtained without any halogen content.

This invention uses organomagnesium compounds which not only have reactive alkyl magnesium bonds but are also stable. These new compounds do not require an ether solvent as Grignard reagents do. Ethers are undesirable in many cases because the coordination of the ether diminishes the reactivity of the alkyl magnesium bond and in some cases, modifies the catalyst activity.

The organomagnesium compounds used in this invention are superior to the dialkylmagnesiums of methyl, ethyl, n-propyl, and n-butyl in that they dissolve more easily in hydrocarbon solvents to give less viscous solutions.

The new compounds of (1) above have only one reactive alkyl magnesium bond unlike the recently discovered solutions of butyl ethyl magnesium, sec-butyl-n-butyl magnesium and similar mixtures.

No complexing agent is required for the organomagnesium compounds of this invention to induce hydrocarbon solubility.

Through the careful selection of the R′ and Y groups in structures I and II above, the electronic and steric structure about the magnesium atom can be varied over a wide range and hence in can be controlled.

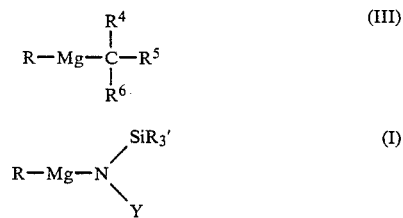

$$R-Mg-\overset{R^4}{\underset{R^6}{C}}-R^5 \quad (III)$$

$$R-Mg-N\begin{matrix}SiR_3'\\ \\Y\end{matrix} \quad (I)$$

In the structures listed above, Y and R′ have been previously described while R$^4$, R$^5$, and R$^6$ are alkyl groups of 1–14 carbon atoms or aryl groups of 6–14 carbon atoms.

Regardless of the choice of the groups R$^4$, R$^5$ and R$^6$ in structure III, the ability to control the electronic and steric structure about the magnesium atom is less than that which is possible with the choice of the R′ and the Y groups in structure I because the difference between —CH$_3$, —C$_2$H$_5$, —C$_3$H$_7$ is chemically less different when compared to —Si(CH$_3$)$_3$ and —C$_2$H$_5$, for example.

Hence, the novel magnesium compounds have an advantage over dialkyl magnesium compounds as catalyst components. Therefore, by using a variety of different magnesium silylamide compounds as catalyst components, catalytic sites with carefully controlled molecular architecture can be developed. Since the electronic and steric structure about the catalytic site strongly influences the polymer species produced, the careful selection of the magnesium silylamide compound can influence and hence control the molecular weight, molecular weight distribution and comonomer incorporation and distribution throughout the polymer species.

EXAMPLES

Example 1

2.48 ml of titanium tetrachloride was added by syringe to a solution of 22.2 mmoles of octyl magnesium bis(trimethylsilyl)amide in about 50 ml of a mixture of hexane and heptane. The solution was contained in a three-neck flask under a purge of N$_2$. The addition of the TiCl$_4$ was completed in about 2 minutes. Black precipitate formed immediately which was dispersed and became a thick slurry. 90 ml of hexane was mixed in by means of the magnet bar stirrer. Within a few minutes, the entire reaction volume gelled.

The solvent was evaporated by heating the flask to 190° C. A black, friable material remained which was reduced to a powder by the magnet bar.

In this catalyst preparation, the Mg/Ti ratio was 1.0, and the calculated titanium content of the product was 10.0 wt.%.

A copolymerization test was conducted at 70° C. in isobutane liquid with 22 wt.% 1-butene, 50 psi H$_2$ partial pressure, and ethylene as required to maintain 350 psig. Triisobutylaluminum (TIBAL) was added to give 2.7 Al/Ti ratio.

The reactivity of the catalyst in the copolymerization was found to be 7078 g/g of catalyst per hour. The melt index by an ASTM method was 3.9 g/10 min. and the density of the copolymer product was 0.913 g/cm$^3$.

Similar copolymerization tests with the reaction products of dibutyl magnesium and titanium tetrachloride gave a density of 0.920 g/cm$^3$. The lower density is an indication of a larger content of short branches from the butene comonomer. Therefore, it is shown by this example that the relative reactivity of 1-butene is greater with the catalyst made with the octyl magnesium bis(trimethylsilyl)amide.

Example 2

12.5 mmol of butyl magnesium bis(trimethylsilyl)amide was deposited on 2.5 g of dry, finely powdered zirconium phosphate. This was done by adding a solution of the magnesium compound in hexane to the zirconium phosphate in a N$_2$-purged flask and evaporating the hexane at 90° C. under flowing N$_2$. To the remaining solid, then, 20 ml of hexane and 1.4 ml of titanium tetrachloride were added. The catalyst was obtained as a free-flowing solid by evaporation of this additional hexane at 90° C., and pulverizing the residue with a magnetic stirring bar. The catalyst was a brown powder.

This catalyst was tested in two ways. In one test the temperature was 71° C. and the conditions as described in Example 1 except that the 1-butene was 10 wt.%. The reactivity was found to be 4952 g/g cat./hr., and the melt index of the product was 1.9 g/10 min. with an annealed density of 0.926 g/cm$^3$.

The second polymerization test was conducted at 150° C. with the commercially available hydrocarbon liquid Isopar E as the solvent. In this case the comonomer was 1-octene instead of 1-butene. The amount of 1-octene was about 22 wt.% of the reaction mixture. The catalyst, TIBAL cocatalyst, Isopar E, 1-octene, hydrogen at 10 psi partial pressure, and ethylene to give 450 psig were added to the vessel in that order. The pressure was kept constant for an hour at 450 psi by adding ethylene as required.

The reactivity was found to be 1932 g/g cat./hr. The annealed density of the product was 0.920 and its melt index was 1.35.

This example shows that the catalyst of the invention can be made in the presence of a finely divided support, and that low density copolymers can be made with good reactivity in particle form and in solution form reactions.

Example 3

16 mmol of butyl magnesium bis(trimethylsilyl)amide dissolved in about 25 mol of heptane was mixed with 1.8 ml of TiCl$_4$ (16 mmol). The solvent was evaporated at 110° C. under flowing N$_2$. The black residue was pulverized in the flask, with the magnet bar, then blended with 2.4 g of silica. The silica had been treated with hexamethyl disilazane and heated at 110° C. prior to its use in this catalyst preparation. All of the manipulations were done so as to avoid exposure of the catalyst preparation to air and moisture.

The catalyst was tested in butene-ethylene copolymerization as described in Example 1 except that the amount of butene was 18 wt.%. The reactivity was 7928 g/g cat./hr., the melt index was 0.97, and the annealed density was 0.920 g/cm$^3$. The bulk density of the particle form copolymer was 16 lbs/ft.$^3$.

This example shows that the catalysts of the invention can be blended with a finely divided support after the reaction product has been formed.

Example 4

16 mmol of butyl magnesium bis(trimethylsilyl)amide dissolved in about 25 ml of hexane was treated with 16 mmol of TiCl$_4$. The solvent was evaporated at 110° C. under N$_2$ and the residue was pulverized.

The catalyst was tested in ethylene-hexene copolymerization at 71° C. in 500 ml of isobutane with 20 wt.% 1-hexene. TIBAL was employed as a cocatalyst. Hydrogen to give a 25 psi partial pressure, and ethylene to maintain 250 psi throughout the reaction time was added.

The product copolymer was obtained in the form of particles without signs of reactor fouling. Its annealed density was 0.919 and its melt index was 8.4.

This example shows that an ethylene-hexene copolymer, a type of material now called linear low density polyethylene, can be made with the catalyst of this invention under particle form conditions without reactor fouling.

The reactivity was 1787 g/g cat./hr.

Example 5

16 mmol of butyl magnesium bis(trimethylsilyl)amide dissolved in about 25 ml of hexane was treated with 8 mmol of TiCl$_4$. The solvent was evaporated as in previous examples.

The catalyst was tested in butene copolymerization as described in Example 1 except that the amount of 1-butene was 15 wt.%.

The reactivity was 1295 g/g cat./hr. and the annealed density of the product was 0.924 g/cm$^3$.

This example illustrates the use of a catalyst with a Mg/Ti ratio of 2.0.

Example 6

The catalyst of this example was prepared by adding 32 mmol of TiCl$_4$ to 16 mmol of butyl magnesium bis(trimethylsilyl)amide so that the Mg/Ti atomic ratio was 0.5. The solvent was evaporated under N$_2$ as in previous examples and then the residue was blended in the absence of solvent with 3.6 g of hexamethyl disilazane-treated silica.

The catalyst was tested in hexene copolymerization as described in Example 4, with 15 wt.% hexene.

The results of two tests are as follows:

| Reactivity (g/g cat./hr.) | MI | Annealed Density g/cm$^3$ | Reactivity (g/g Ti/hr.) |
|---|---|---|---|
| 3600 | 5.1 | 0.925 | 34,050 |
| 3374 | 8.5 | 0.924 | 31,920 |

An additional 2.4 g of the treated silica was blended into the dry catalyst preparation, and the resulting blend was tested in the same manner:

| Reactivity (g/g cat./hr.) | MI | Annealed Density g/cm$^3$ | Reactivity (g/g Ti/hr.) |
|---|---|---|---|
| 3476 | 6.3 | Not measured | 38,300 |

This example illustrates the preparation of a catalyst with a Mg/Ti ratio of 0.5, the dry blending of the catalyst with silica, and the use of the catalyst in hexene-ethylene copolymerization under particle form conditions.

Example 7

16 mmol of butyl magnesium bis(trimethylsilyl)amide was mixed with 5.0 g of low density polyethylene powder in about 25 ml of heptane. The mixture was combined with 16 mmol of TiCl$_4$ and the heptane was evaporated at 110° C. under flowing N$_2$.

The catalyst was tested with TIBAL cocatalyst in the copolymerization of 1-hexene and ethylene in isobutane at 68° C. The amount of 1-hexene was 20 wt.%, the hydrogen partial pressure was 25 psi and ethylene was added to keep the pressure constant at 240 psig. Reactivity was 2596 g/g cat./hr. and the annealed density of the product was 0.928 g/cm$^3$.

The melt index was 0.11 and by infrared spectroscopy the product contained 9.9 methyl groups per 1000 carbon atoms.

A similar catalyst was made with polyethylene powder except that the amount of TiCl$_4$ was increased giving a Mg/Ti ratio of 0.5. In a hexene copolymerization test as above the reactivity was 6612 g/g cat./hr. and the density of the product was 0.918 with a melt index of 0.4 and a methyl group content of 11.0. The ratio of high load melt index to melt index was 36.

This example shows the use of polyethylene powder as a carrier, and shows a situation in which a catalyst with a Mg/Ti ratio of 0.5 is superior to a catalyst with a Mg/Ti ratio of 1.0.

Example 8

16 mmol of butyl magnesium bis(trimethylsilyl)amide in about 25 ml of heptane was combined with 16.5 mmol of diethylaluminum chloride as a 25 wt.% solution in heptane. A slurry formed, which was stirred for 30 minutes at room temperature.

1.8 ml of $TiCl_4$ was added by syringe so that the Mg/Ti ratio was 1.0. The solvent was evaporated by heating under $N_2$ in an oil bath at a temperature of 110° C. The residue was broken into a powder with the magnetic stirrer.

In ethylene-1-hexene copolymerization tests as described in Example 7 but with 250 psi total pressure the results were as follows:

| Reactivity (g/g cat./hr.) | MI | Density (Unannealed) (g/cm$^3$) |
|---|---|---|
| 3792 | 0.10 | 0.921 |
| 3686 | 0.18 | 0.925 |

This example shows that an aluminum chloride compound may be added to the alkyl magnesium silylamide prior to the reaction with the transition metal compound.

Example 9

15 mmol of silicon tetrachloride was added by syringe to 16 mmol of butyl magnesium bis(trimethylsilyl)amide dissolved in about 25 ml of heptane. A white slurry was formed by the addition, and to this slurry 16 mmol of $TiCl_4$ was added. The combination was stirred 30 minutes at room temperature and then the solvent was evaporated under flowing $N_2$ at 90° C.

This catalyst preparation was tested in hexene-ethylene copolymerization at 54° C. with 500 ml isobutane, 20 wt.% 1-hexene, a hydrogen partial pressure of 40 psi and ethylene to maintain a constant pressure of 205 psig.

The catalyst reactivity was 1516 g/g cat./hr., the melt index was 0.60, and the ratio of High Load Melt Index to Melt Index was 32. The unannealed density was 0.925 g/cm$^3$.

This example illustrates the reaction of an alkyl magnesium silylamide with silicon tetrachloride prior to its reaction with the transition metal compound.

Example 10

A solution in heptane was prepared containing 16 mmol of the silylamide of the structure shown,

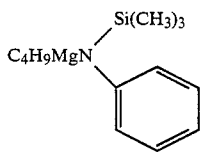

in about 25 ml. To this solution, 16 mmol of $TiCl_4$ was added. The solvent was evaporated at 110° C. under a flow of $N_2$, and the residue was pulverized with the magnetic stirrer.

The catalyst was tested in the particle form polymerization of ethylene at 102° C. in 500 ml of isobutane. The hydrogen partial pressure was 50 psi and the total pressure of 550 psig was kept constant with ethylene as required. TIBAL solution in the amount of 9.2 mmol per gram of catalyst was added as a cocatalyst.

The reactivity was 2963 g/g cat./hr., the melt index was 0.68, and the High Load Melt Index to Melt Index ratio was 27.

This example shows catalyst preparation from another alkyl magnesium silylamide of the invention.

Example 11

5 g of high density polyethylene powder (a commercial product with the trade name Microthene) was combined with a solution of 16 mmol of butyl magnesium bis(trimethylsilyl)amide in 25 ml of heptane. By syringe 32 mmol of $TiCl_4$ was added and the reaction mixture was stirred at room temperature for 30 minutes prior to solvent evaporation at 110° C.

The catalyst was tested with TIBAL cocatalyst in ethylene-hexene copolymerization as described in Example 9.

The reactivity of the catalyst was 2756 g/g cat./hr., the melt index was 1.9, and the unannealed density of the ethylene-hexene copolymer was 0.923 g/cm$^3$.

This example shows that the catalyst components can be blended with high density polyethylene powder.

Example 12

The catalyst of Example 11 was tested in a high temperature polymerization experiment with ethylene. In this test, diethylaluminum chloride was used as the cocatalyst at a ratio of Al/Ti of 7.1.

The cocatalyst was added to 500 ml of mineral spirits (Phillips Petroleum Company product Soltrol 130) in the polymerization test vessel and the temperature was adjusted to 184° C. Ethylene was added to give 450 psig pressure then 0.0875 g of the catalyst was injected quickly and the ethylene pressure was increased to 550 psig. The reaction was continued under these conditions for 15 minutes during which time the temperature increased to 233° C. because of the heat of polymerization.

The reactivity was 2670 g/g cat./hr. of reaction time, or 44.5 g/g cat. per minute.

This example illustrates the reactivity of the invention catalysts at high temperature and the use of diethylaluminum chloride as the cocatalyst.

The melt index of the polyethylene was 0.91 g/10 minutes.

Example 13

A slurry was prepared containing 8 mmol of the alkyl magnesium silylamide with the structure below in 25 ml of heptane:

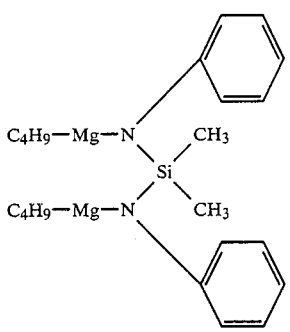

To this slurry 16 mmol of TiCl₄ was added to give a mixture in which the Mg/Ti ratio was 1.0. The solvent was evaporated under nitrogen as in previous examples.

In a particle form polymerization test of ethylene with TIBAL cocatalyst the reactivity was found to be 961 g/g cat./hr.

This example shows a catalyst with another alkyl magnesium compound of the invention. In this case the silylamide compound is not readily soluble in hydrocarbon liquids at room temperature.

Example 14

A zirconium tetrachloride solution was prepared from 0.747 g (2.04 mmol) and 10 ml of dry, oxygen-free diethyl ether. The zirconium chloride solution was then added to 20.4 mmol of butyl magnesium bis(trimethylsilyl)amide dissolved in 56 ml of heptane. When the solution became a golden brown color, 18.4 mmol of TiCl₄ was added. The reaction mixture became warm and at least some of the diethyl ether was carried away by the N₂ flow through the flask. The reaction was stirred at 25° C. for 80 minutes, and then the volatile materials were evaporated at 90° C. in an oil bath. A brown-black powder was obtained.

The catalyst was tested for particle form polymerizationn of ethylene under the conditions described in Example 10. It gave 8300 g/g cat./hr. A second catalyst, made in the same way, was also tested under the same conditions. It gave 8200 g/g cat./hr. with a melt index of 0.75 and a high load melt index ratio of 23.9.

This example illustrates the use of a mixture of transition metals with the alkyl magnesium silylamides of the invention.

Example 15

A catalyst was prepared from butyl magnesium bis(trimethylsilyl)amide and TiCl₄ as described in Example 4. It was tested in the particle form polymerization of ethylene with the conditions of Example 10 with various organometallic cocatalysts. The results of these tests are given below.

| Organometallic Cocatalyst | Metal/ Ti Ratio | Reactivity g/g cat./hr. | MI |
|---|---|---|---|
| TIBAL | 10 | 3621 | 0.43 |
| Diethyl Aluminum Chloride | 10 | 2017 | 0.16 |
| Butyl Ethyl Magnesium | 10 | 2350 | 0.27 |
| n-butyl Lithium | 10 | 148 | NA |

Example 16

15.95 mmol of VOCl₃ was added slowly to 15.95 mmol of butyl magnesium bis(trimethylsilyl)amide dissolved in 20 ml of heptane in a N₂-purged flask. The reaction was conducted for 30 minutes then the flask was placed in an oil bath with a temperature of 100° C. The volatiles were swept away by a flow of N₂. A black residue remained which was readily pulverized with the magnetic stirrer.

The catalyst was tested with TIBAL cocatalyst in hexene copolymerization as described in Example 9. The reactivity was 266 g/g of vanadium per hour.

Example 17

A mixed solution of titanium tetraisopropoxide and zirconium tetraisopropoxide was prepared containing
  15 ml heptane
  0.81 ml titanium tetraisopropoxide
  1.91 ml zirconium tetran-propoxide complex with n-propyl alcohol.

This mixed solution contained 2.76 mmol of titanium compound and 4.75 mmol of zirconium compound. It was stirred 30 minutes at room temperature.

Without exposure to room air, the mixed solution was then transferred to a flask containing 8.3 mmol of butyl magnesium bis(trimethylsilyl)amide and about 12 ml of heptane. The golden brown solution was stirred one hour at 25° C., then one hour at 90° C., and cooled to 60° C. At this temperature, 64.6 ml of ethyl aluminum sesquichloride solution was added. The ethyl aluminum sesquichloride solution was 25 wt.% in heptane.

Upon addition of the ethyl aluminum sesquichloride a finely divided brown precipitate formed. After stirring for 5 minutes the precipitate was allowed to settle for 1½ hr. After removal of the liquid phase, 40 ml heptane was added to the remaining solid. The combination was stirred, then after settling the liquid phase was again removed. Finally the remaining solid was heated at 100° C. with flowing N₂, and at 90° C. under an oil pump vacuum.

The catalyst was tested at 71° C. in an ethylene-hexene copolymerization experiment, and yielded copolymer with a density of 0.921 g/cm³ with a reactivity of 3153 g/g cat./hr. The reactivity calculated with respect to the titanium content of the catalyst was 344,000 g/g Ti per hr. TIBAL was the cocatalyst.

This catalyst was also tested at 200° C. in Isopar H as the solvent. Isopar H is a hydrocarbon liquid sold by Exxon Corp. In this case, the cocatalyst was diethylaluminum chloride and the Al/Ti ratio was 100.

The pressure was 550 psig and the duration was 10 minutes. The reactivity was 5895 g/g of titanium per minute.

This example illustrates the use of a mixture of transition metal compounds, the use of transition metal compounds which are not halides and a method of preparation which involves washing the catalyst with a nonreactive solvent.

Example 18

13.0 ml (20 mM) of a heptane solution of ethylaluminum dichloride was added to a flask followed by the slow addition of 8.9 ml (5.0 mM) of a 0.57M hexane solution of butyl magnesium bis(trimethylsilyl)amide. A finely divided white precipitate formed. Next, 1.0 ml of a 1M solution of TiCl₄ in heptane (1 mM TiCl₄) was added to form a yellow-tan suspension. After stirring ½ hr. the catalyst slurry was tan to brown.

The catalyst slurry was tested for ethylene polymerization under the conditions:
Isobutane diluent, temp—101.6° C.
50 psi $H_2$ pressure, total pressure
500 psig. The cocatalyst was TIBAL.
Reactivity=5088 g PE/g dry cat/hr.
Reactivity=400,654 g PE/g Ti/hr.
This catalyst exhibits very high activity.

Example 19

13.0 ml of a heptane solution of ethylaluminum dichloride=EADC (20 mM) was added to 16.3 ml of Isopar H. Then 10.0 ml of a 0.5M solution of butyl magnesium bis(trimethylsilyl) amide (5 mM) were added slowly. A finely divided white precipitate formed. After stirring 30 min., 1 ml of a 1M $TiCl_4$ solution in Isopar H (1 mM $TiCl_4$) was added slowly. The suspension turned a yellow-tan color. With time, the suspension turned a deeper tan-brown color with a fading of the yellow tint. This catalyst settled significantly in 5 min. The catalyst slurry was split into two portions, one for polymerization tests while the second was ball milled. Ball milling was conducted in a Tema-Siebtechnik 0.6 l ball mill using 100 stainless steel balls—850 grams for 5½ hr. Polymerization experiments were conducted in a glass reactor system at 55° C., solvent heptane, 35 psi ethylene pressure and 1-hexene was noted.

The catalyst slurry and cocatalyst TIBAL were syringed into the reactor after it was purged with $N_2$ and had been charged with 500 ml of heptane. Next 10 ml of 1-hexene was added and the ethylene (35 psi) turned on. The copolymerizations ran 30 min. The average of 2 polymerizations each are given below.

|  | Reactivity g/PE/g Ti/hr |
|---|---|
| Catalyst Slurry Ball milled | 19,124 |
| Catalyst Slurry | 23,570 |
| Catalyst Slurry | 25,123 |

This example shows that ball milling increases catalyst activity.

Example 20

To a flask was added 20 ml of heptane followed by 16.5 ml of heptane solution of ethyl boron dichloride (10 mM). Next 4.5 ml of a hexane solution (0.56M) of butylmagnesium bis(trimethylsilyl)amide (2.5 mM) was added. A white stirrable jelly like precipitate formed. Then 0.5 ml of a 1M solution in heptane of $TiCl_4$ (0.5 mM) was added to form a pale yellow-green slurry. The catalyst was dried at 105° C. to form a brown free flowing powder. The solid catalyst and a heptane solution of TIBAL (0.031 g cat, 0.31 ml TIBAL) were added to the reactor and polymerized as described in Example 18.
Reactivity=5,270 g PE/g cat/hr.
Reactivity=380,884 g PE/g Ti/hr.
This example shows that an alkyl boron halide compound may be used to obtain a highly active catalyst.

Example 21

0.16 g (mM) $CrCl_3$ was added to a flask followed by 20 ml of heptane. Next 17.9 ml of heptane solution (0.57M) of butyl-magnesium bis(trimethylsilyl)amide were added. A small amount of white precipitate formed but some of the $CrCl_3$ still remained as a solid. The mixture was heated 100 min. at 70° C. After cooling to room temperature 1.0 ml (9 mM) of $TiCl_4$ were added. The catalyst was dried at 105° C. to form a free flowing powder.

Example 22

13.0 ml of a heptane solution of ethylaluminum dichloride (20 mM) were added to a flask followed by the slow addition of 8.9 ml of a hexane solution (0.56 mM) of butyl magnesium bis(trimethylsilyl)amide. A fine white suspension formed. Next 0.4 ml (1 mM) of $Zr(OC_3H_7)_4XC_3H_7OH$ was added. The mixture was a cloudy yellow-orange color. After stirring 30 min., 1.0 ml of a 1M solution in heptane, $TiCl_4$ (1 mM) was added. The mixture turned deeper yellow in color. After stirring 2 hr. the catalyst was allowed to settle overnight. A brown solid formed. The catalyst was then dried at 105°0 C. for 2 hr. to form brown powder.

Example 23

20 ml of heptane and 8.9 ml of a hexane solution (0.57M) of butylmagnesium bis(trimethylsilyl)amide (5 mM) were added to the flask. Then 0.40 ml of $Zr(OC_3H_7)_4C_3H_7OH$ (1 mM) was added. The mixture was a clear orange. After stirring 30 min., 6.5 ml of a heptane solution of ethylaluminum dichloride were added (10 mM). A brown precipitate formed and thickened to a viscous stirrable liquid suspension. Next 1 ml of a 1M $TiCl_4$ solution in heptane (1 mM $TiCl_4$) was added. The mixture remained brown but appeared more uniform. The catalyst was dried to a brown-black powder.

Examples 21, 22 and 23 exhibit that free flowing powders can be obtained.

Example 24

To a purged flask was added 17.6 ml (13.3 mM) of a heptane solution of ethylaluminum sesquichloride. Next 8.9 ml (5 mM) of a hexane solution of butylmagnesium bis(trimethylsilyl)amide were added slowly. A milky white suspension resulted. After stirring 15 min., 1 ml of a 1M solution (1 mM) of $TiCl_4$ was added.

This example shows that ethylaluminum sesquichloride can be used in place of ethylaluminum dichloride.

The catalyst was tested as described in Example 19 for ethylene 1-hexene interpolymerization.
Reactivity=110 g PE/g cat/hr.
Reactivity=10,371 g PE/g Ti/hr.

Example 25

This catalyst is very similar to Example 24 except that 19 ml of heptane and 4.3 ml (3.4 mM) of ethylaluminum sesquichloride were added in place of the 13.3 mM used in Example 24.

This example shows that an active catalyst can be made with various ratios of the catalyst components.

The catalyst was tested for ethylene-1-hexene interpolymerization as described in Example 19.
Reactivity=312 g PE/g cat/hr.
Reactivity=13,632 g PE/g cat/hr.

Example 26

40.0 ml of a 0.25M solution of butyl magnesium bis(-trimethylsilyl)amide were added to a flask. Then 1.1 ml (10 mM) of TiCl₄ was added dropwise at ~23° C. A viscous suspension formed.

The catalyst was tested for ethylene polymerization as described in Example 19.

|                           | Test 1 | Test 2 |
|---------------------------|--------|--------|
| Cocatalyst Al/Ti          | 30     | 0      |
| Catalyst Volume           | 0.5    | 0.5    |
| Reactivity g PE/g Ti/hr.  | 815    | 111    |

This example shows that alkyl aluminum compounds are not required for activity.

Example 27

To a flask were added 10 ml of Isopar H and 9.77 ml of a heptane solution of ethylaluminum dichloride (15 mM). Then 17.8 ml of a heptane solution (0.56M) of butylmagnesium bis(trimethylsilyl)amide were added slowly. A viscous white precipitate formed. After the addition of 20 ml of Isopar H 1.0 ml (1 mM) of a 1M solution of TiCl₄ in heptane were added. This resulted in a suspension of a yellow-green color.

The catalyst was tested for ethylene-1-butene polymerization at 200° C. in Isopar H solvent with 15 wt.% 1-butene and a total pressure of 500 psi maintained by feeding ethylene on demand. The polymerization time was 1 min.

|                              | Run 1   | Run 2   |
|------------------------------|---------|---------|
| Cocatalyst                   | DEAC    | —       |
| Al/Ti                        | 33      | 0       |
| Reactivity g PE/g Ti/min.    | 16,303  | 21,707  |

This example shows that additional alkyl aluminum is not required to obtain high activity.

Example 28

A 238 g quantity of cyclohexane and a 38 g quantity of 1,3-butadiene were mixed in a dry, N₂-purged, one quart crown cap beverage bottle. A heptane solution of butyl magnesium bis(trimethylsilyl)amide was added in two doses. First 10.5 ml (6.0 mM) was added, then 40 min. later another 10.5 ml was added. The reaction mixture was constantly stirrred with a magnet bar. After an aging time of 1½ hr. at 55° C., 0.12 ml (1.07 mM) of titanium tetrachloride was introduced. Soon the viscosity of the solution increased greatly due to 1,3-butadiene polymerization. 95 min. later 2.2 mM of benzyl chloride was added. At the end of 120 min. from titanium chloride addition, an excess of isopropylalcohol was injected to terminate the polymerization. The polymer was separated by pouring the solution in 600 ml of methyl alcohol. The yield of dry rubbery and tacky polymer was 58 g/g of titanium.

Example 29

A 200 ml volume of 4-methylpentene-1, 0.2 ml of titanium tetrachloride, and 1.6 ml of a solution of butyl magnesium bis(trimethylsilyl)amide were combined in a crown cap bottle. The Ti/Mg ratio was 2/1. After 3 min., 1.0 ml of a heptane solution of triisobutylaluminum was added to make the Ti/Al ratio equal to one. A slurry of poly(4-methylpentene-1) began to form. Continuous mixing was provided by means of a magnet bar. After 63 min. of reaction time, another 0.5 ml of triisobutylaluminum solution was added to change the Ti/Al ratio to 0.67. The second addition of organoaluminum cocatalyst had no noticeable effect upon the reaction which was terminated after 74 min. with 5 ml isopropyl alcohol. The reaction solution was poured into 1 liter of methyl alcohol, and the polymer product was separated and dried.

The yield was 20 g and the conversion was 15%. The rate of conversion in this experiment was greater than literature reports for Ziegler-Natta catalyst. The polymer was pressed into films of almost perfect clarity.

Example 30

A 20 ml volume of Exxon Isopar H solvent and 0.15 ml of titanium tetraisopropoxide were combined in a dry, N₂-swept flask. A 26 ml volume of a heptane solution of butyl magnesium bis(trimethylsilyl)amide was added with stirring. The Mg/Ti ratio was 30. After 30 min., dry HCl gas was passed over the stirring solution for 20 min. Heat was generated by the reaction with HCl, the flask becoming noticeably hot to touch. The resulting catalyst was a brown slurry.

This slurry was evaluated in the polymerization of ethylene in Isopar H solvent at 200°-230° C. was various amounts of hydrogen. The total pressure of each reaction was 550 psi and the reaction time was 10 min. Some results of the tests are listed below.

| Test No. | H₂,PSI | Catalyst Reactivity g/g cat/min. | Titanium Reactivity g/g Ti/min. | MI  |
|----------|--------|----------------------------------|---------------------------------|-----|
| 1        | 0      | 61                               | 11,300                          | 1.9 |
| 2        | 10     | 68                               | 12,500                          | 3.2 |
| 3        | 20     | 91                               | 16,800                          | 7.3 |
| 4        | 50     | 37                               | 6,900                           | N/A |

In these experiments, diethylaluminum chloride was employed as a cocatalyst in an amount to give an Al/Ti ratio of 50.

Example 31

2.465 g of dry, finely divided silica of the Tulco Company with the designation Tullanox 500 was used in the catalyst preparation. It was stirred with 75 ml Isopar H and 9.75 ml of butyl magnesium bis(trimethylsilyl)amide solution (5.55 mM). 0.10 ml of titanium tetraisopropoxide was added so that the Mg/Ti ratio was 15. Dry HCl gas was passed over the slurry for 20 min. The color changed from brownish to pale green. This catalyst slurry was tested in ethylene-butene-1 copolymerization with an initial temperature of 200° C. The total pressure was 550 psig, the solvent was 500 ml Isopar H, and butene-1 amounting to 15 wt.% of the Isopar H and ethylene was added. In this case, the cocatalyst was tetraisobutyldialuminoxane, a product of Schering AG. It was added to the polymerization reaction to give an Al/Ti ratio of 50. The reaction was run for 10 min.

The titanium reactivity was 3730 g/g Ti/min. By infrared analysis of the polymer the number of methyl groups per 1000 carbon atoms was found to be 24.9 which indicates a density of 0.924 g/cm³.

We claim:
1. An olefin polymerization and interpolymerization catalyst prepared by reacting:
   (a) one or more magnesium silylamide compounds represented by the formulas:

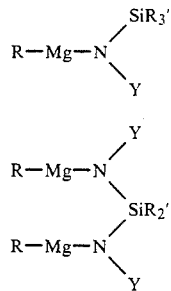

(I)

(II)

in which R is a straight or branched chain hydrocarbyl group comprising alkyl groups of about 1–18 carbon atoms and aryl groups of about 6 to 14 carbon atoms, and the R groups are the same or different, R' is R or hydrogen, Y is R or —SiR'$_3$, all R' are the same or different, all Y are the same or different with
  (b) at least one halide or alkoxide of a transition metal selected from Groups IIIB, IVB, VB and VIB of the fourth and fifth periods of the periodic table, and Groups VIIB and VIIIB of the fourth period, and
  (c) one or more of a Lewis acid, a hydrogen halide or ZrCl$_4$.

2. The catalyst of claim 1 wherein (a) comprises an alkyl magnesium bis(trialkylsilyl)amide, said alkyl having about 1–18 carbon atoms.

3. The catalyst of claim 1 wherein said (a) comprises butyl magnesium bis(trimethylsilyl)amide.

4. The catalyst of claim 1 wherein a solvent is present and is retained after the reaction to provide the catalyst in suspension.

5. The catalyst of claim 1 wherein said ingredients are deposited on or reacted with a finely divided support prior to said reaction.

6. The catalyst of claim 5 wherein said support comprises a difficult to reduce material comprising silica, alumina, zirconia, thoria, an organic polymer, titania, magnesia, zirconium phosphate or mixtures thereof.

7. The catalyst of claim 1 wherein the Mg transition metal atom ratio is from 0.2–100 to 1.

8. The catalyst of claim 7 wherein said ratio is about 0.4–30 to 1.

9. The catalyst of claim 1 wherein said catalyst is used with an organometallic cocatalyst.

10. The catalyst of claim 9 wherein said cocatalyst comprises an alkylaluminum compound in a ratio of aluminum to transition metal of up to 500 to 1.

11. The catalyst of claim 10 wherein said ratio is about 1–50 to 1.

12. The catalyst of claim 1 wherein said Lewis acid is of the formula $R_n^3AlX_{3-n}$ or $R_n^3BX_{3-n}$ where $R^3$ is alkyl or aryl, X is hydrogen or halogen, and n=0 to 3, inclusive.

13. The method of making an olefin polymerization and interpolymerization catalyst, comprising the step of reacting:
  (a) one or more magnesium silylamide compounds represented by the formulas:

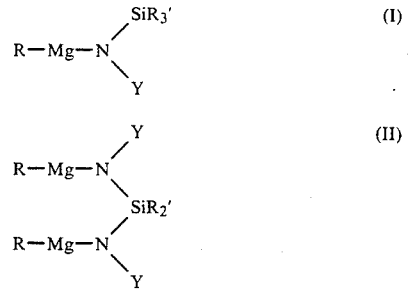

in which R is a straight or branched chain hydrocarbyl group comprising alkyl groups of about 1–18 carbon atoms and aryl groups of about 6 to 14 carbon atoms, and the R groups are the same or different, R' is R or hydrogen, Y is R or —SiR'$_3$, all R' are the same or different, all Y are the same or different, with
  (b) at least one halide or alkoxide of a transition metal selected from Groups IIIB, IVB, VB and VIB of the fourth and fifth periods of the periodic table, and Groups VIIB and VIIIB of the fourth period, and
  (c) one or more of a Lewis acid, hydrogen halide or ZrCl$_4$.

14. The method of claim 13 wherein (a) comprises an alkyl magnesium bis(trialkylsilyl)amide, said alkyl having about 1–18 carbon atoms.

15. The method of claim 13 wherein said (a) comprises butyl magnesium bis(trimethylsilyl)amide.

16. The method of claim 13 wherein a solvent is present and is retained after the reaction to provide the catalyst in suspension.

17. The method of claim 13 wherein said ingredients are deposited on or reacted with a finely divided support prior to said reaction.

18. The method of claim 17 wherein said support comprises a difficult to reduce material comprising silica, alumina, zirconia, thoria, an organic polymer, titania, magnesia, zirconium phosphate or mixtures thereof.

19. The method of claim 13 wherein the Mg/transition metal atom ratio is from 0.2–100 to 1.

20. The method of claim 19 wherein said ratio is about 0.4–30 to 1.

21. The method of claim 13 wherein said catalyst is used with an organometallic cocatalyst.

22. The method of claim 21 wherein said cocatalyst comprises an alkylaluminum compound in a ratio of aluminum to transition metal of up to 500 to 1.

23. The method of claim 22 wherein said ratio is about 1–50 to 1.

24. The method of of claim 13 wherein said Lewis acid is of the formula $R_n^3AlX_{3-n}$ or $R_n^3BX_{3-n}$ where $R^3$ is alkyl or aryl, X is hydrogen or halogen, and n=0 to 3, inclusive.

* * * * *